United States Patent
Monaghan et al.

(10) Patent No.: US 9,721,391 B2
(45) Date of Patent: Aug. 1, 2017

(54) POSITIONING OF PROJECTED AUGMENTED REALITY CONTENT

(71) Applicant: CANON KABUSHIKI KAISHA, Tokyo (JP)

(72) Inventors: David Robert James Monaghan, Elanora Heights (AU); Belinda Margaret Yee, Balmain (AU); Oscar Alejandro De Lellis, Clovelly (AU)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/709,267

(22) Filed: May 11, 2015

(65) Prior Publication Data
US 2015/0332507 A1 Nov. 19, 2015

(30) Foreign Application Priority Data
May 13, 2014 (AU) ................. 2014202574

(51) Int. Cl.
*G06T 19/00* (2011.01)
*G06F 3/14* (2006.01)
(Continued)

(52) U.S. Cl.
CPC ............ *G06T 19/006* (2013.01); *G06F 3/011* (2013.01); *G06F 3/017* (2013.01); *G06F 3/14* (2013.01);
(Continued)

(58) Field of Classification Search
None
See application file for complete search history.

(56) References Cited

U.S. PATENT DOCUMENTS

2012/0075440 A1* 3/2012 Ahuja ................. G06T 7/0081
348/61
2012/0092369 A1 4/2012 Kim et al.
(Continued)

FOREIGN PATENT DOCUMENTS

EP 1443775 A2 8/2004
EP 2506222 A2 10/2012
(Continued)

OTHER PUBLICATIONS

Kobayashi, Motoki, and Hideki Koike. "EnhancedDesk: integrating paper documents and digital documents." Computer Human Interaction, 1998. Proceedings. 3rd Asia Pacific. IEEE, 1998.*
(Continued)

*Primary Examiner* — Ryan M Gray
(74) *Attorney, Agent, or Firm* — Canon USA, Inc. I.P. Division

(57) ABSTRACT

A method of displaying augmented reality content on a physical surface is disclosed. A surface complexity measure is determined for the physical surface from a captured image of the physical surface. A content complexity measure is determined for the augmented reality content to be applied to the physical surface. The content complexity measure represents an amount of fine detail in the augmented reality content. The method determines if the amount of fine detail in the augmented reality content is to be modified, based on a function of the surface complexity measure and said content complexity measure. A display attribute of the augmented reality content is adjusted to modify the fine detail in the augmented reality content. The modified augmented reality content is displayed on the physical surface.

15 Claims, 10 Drawing Sheets

(51) Int. Cl.
*G06F 3/01* (2006.01)
*H04N 9/31* (2006.01)
*G06T 7/41* (2017.01)
*G09G 3/00* (2006.01)

(52) U.S. Cl.
CPC ............. *G06T 7/41* (2017.01); *H04N 9/3188* (2013.01); *H04N 9/3194* (2013.01); *G09G 3/002* (2013.01); *G09G 2370/022* (2013.01)

(56) References Cited

U.S. PATENT DOCUMENTS

| | | | |
|---|---|---|---|
| 2013/0182012 A1 | 7/2013 | Kim et al. | |
| 2014/0063060 A1* | 3/2014 | Maciocci | G06F 3/011 345/633 |
| 2014/0168262 A1* | 6/2014 | Forutanpour | G06T 19/006 345/633 |
| 2015/0221133 A1* | 8/2015 | Groten | G06K 9/00671 345/633 |

FOREIGN PATENT DOCUMENTS

| | | |
|---|---|---|
| EP | 2712193 A1 | 3/2014 |
| WO | 2012/023004 A1 | 2/2012 |

OTHER PUBLICATIONS

Wloka, Matthias M., and Brian G. Anderson. "Resolving occlusion in augmented reality." Proceedings of the 1995 symposium on Interactive 3D graphics. ACM, 1995.*

Gabbard, Joseph L., et al. "An empirical user-based study of text drawing styles and outdoor background textures for augmented reality." Virtual Reality, 2005. Proceedings. VR 2005. IEEE. IEEE, 2005.*

Freeman, E. et al, "Messy Tabletops: Clearing Up the Occlusion Problem", CHI '13 Extended Abstracts, Apr. 27, 2013, pp. 1515-1520, Paris, France.

* cited by examiner

Lorem ipsum dolor sit ame
consectetuer adipiscing eli
sed diam nonummy nibh e   900
mod tincidunt ut laoreet do
magna aliquam erat volutp
Ut wisi enim ad minim veni
quisend nostrud exerci tati
ullamcorper suscipit loborti
nisl ut aliquip ex ea comm
consequat. Duis autem vel

Fig. 9A

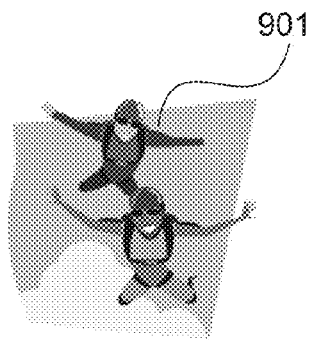

Lorem ipsum dolor sit ame
consectetuer adipiscing eli
sed diam nonummy nibh e
mod tincidunt ut laoreet do
magna aliquam erat volutp
Ut wisi enim ad minim veni
quisend nostrud exerci tati
ullamcorper suscipit loborti
nisl ut aliquip ex ea comm
consequat. Duis autem vel

Lorem ipsum dolor sit ame
consectetuer adipiscing eli
sed diam nonummy nibh e
mod tincidunt ut laoreet do
magna aliquam erat volutp
Ut wisi enim ad minim veni
quisend nostrud exerci tati
ullamcorper suscipit loborti
nisl ut aliquip ex ea comm
consequat. Duis autem vel

Fig. 9D

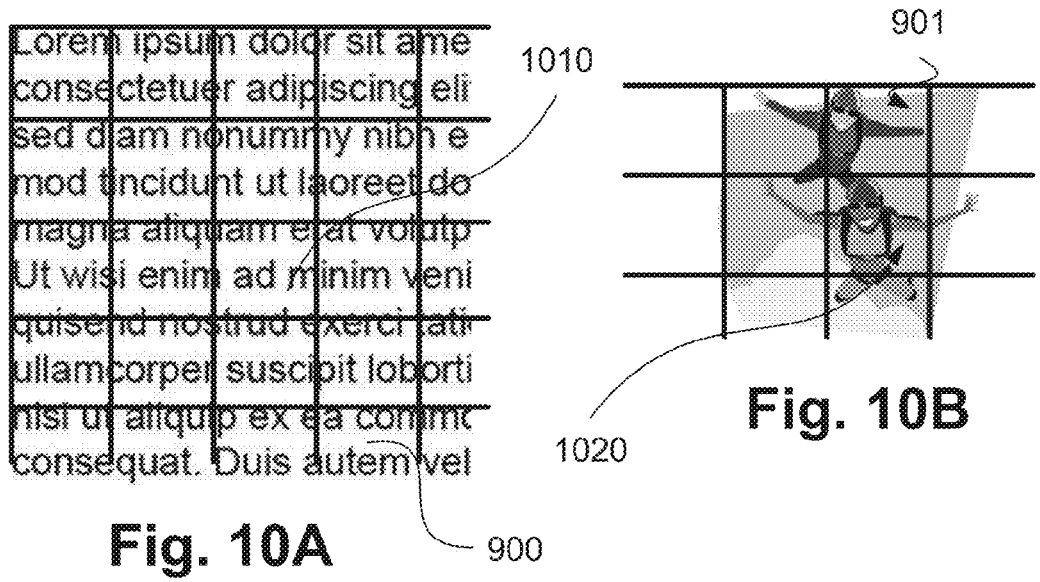
Fig. 10A
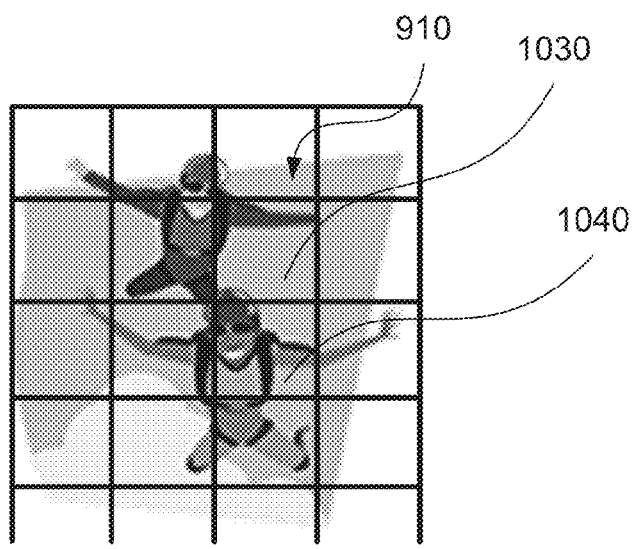
Fig. 10B
Fig. 10C

POSITIONING OF PROJECTED AUGMENTED REALITY CONTENT

REFERENCE TO RELATED PATENT APPLICATION(S)

This application claims the benefit under 35 U.S.C. §119 of the filing date of Australian Patent Application No. 2014202574, filed 13 May 2014, hereby incorporated by reference in its entirety as if fully set forth herein.

TECHNICAL FIELD

The present invention relates to data representation and, more particularly, to providing legibility of augmented reality content against a complex background. The present invention also relates to a method and apparatus for applying augmented reality content to a physical surface, and to a computer program product including a computer readable medium having recorded thereon a computer program for applying augmented reality content to a physical surface.

BACKGROUND

Printed documents have been a primary source of communication for many centuries. It has been used widely across different domains such as in news reporting, advertising, office environments (large and small offices alike) and so on. The last decade has witnessed an explosion in popularity of mobile hand-held devices such as smart phones and more recently tablet and wearable devices. The ubiquitous nature of print media and ever increasing popularity of hand-held and wearable devices have led to a new genre of applications based on augmented reality.

Augmented reality (or "AR" in short) is a view of a physical world where some elements of physical reality are augmented by computer generated inputs such as sound, graphics and so on. Users are able to use such hand-held and wearable devices to retrieve additional information related to a captured image of a real world object from a camera connected to the device (e.g. a camera phone or a camera attached to a head-mounted display or AR glasses) and augment the additional information to the real world object. Such a real-world object may be a natural image in a document, a piece of textual information, a physical object such as a printer and so on.

In addition to hand-held devices, projectors are also being used to show augmented reality information, especially in an office environment. For example, projectors, in conjunction with a camera, are being used to provide an augmented reality system. A projection based augmented reality system provides hands-free and glasses-free augmented reality to the end-user.

A need exists to ensure that a projection based augmented reality system provides a fulfilling experience to a user regardless of limitations posed by an environment in which the system is being used.

SUMMARY

It is an object of the present invention to substantially overcome, or at least ameliorate, one or more disadvantages of existing arrangements.

According to one aspect of the present disclosure, there is provided a method of displaying augmented reality content on a physical surface, the method comprising:

determining a surface complexity measure for said physical surface from a captured image of said physical surface;

determining a content complexity measure for the augmented reality content to be applied to said physical surface, said content complexity measure representing an amount of fine detail in said augmented reality content;

determining if the amount of fine detail in said augmented reality content is to be modified, based on a function of said surface complexity measure and said content complexity measure;

adjusting a display attribute of said augmented reality content to modify the fine detail in said augmented reality content; and displaying the modified augmented reality content on said physical surface.

According to another aspect of the present disclosure, there is provided a system for displaying augmented reality content on a physical surface, the system comprising:

a memory for storing data and a computer program;

a processor coupled to the memory for executing said computer program, said computer program comprising instructions for:

determining a surface complexity measure for said physical surface from a captured image of said physical surface;

determining a content complexity measure for the augmented reality content to be applied to said physical surface, said content complexity measure representing an amount of fine detail in said augmented reality content;

determining if the amount of fine detail in said augmented reality content is to be modified, based on a function of said surface complexity measure and said content complexity measure;

adjusting a display attribute of said augmented reality content to modify the fine detail in said augmented reality content; and displaying the modified augmented reality content on said physical surface.

According to still another aspect of the present disclosure, there is provided a computer readable medium having a computer program stored thereon for displaying augmented reality content on a physical surface, the program comprising:

code for determining a surface complexity measure for said physical surface from a captured image of said physical surface;

code for determining a content complexity measure for the augmented reality content to be applied to said physical surface, said content complexity measure representing an amount of fine detail in said augmented reality content;

code for determining if the amount of fine detail in said augmented reality content is to be modified, based on a function of said surface complexity measure and said content complexity measure;

code for adjusting a display attribute of said augmented reality content to modify the fine detail in said augmented reality content; and code for displaying the modified augmented reality content on said physical surface.

Other aspects of the invention are also disclosed.

BRIEF DESCRIPTION OF THE DRAWINGS

One or more embodiments of the invention will now be described with reference to the following drawings, in which:

FIG. 9A shows an example of a desktop region;

FIG. 9B shows an example of augmented reality content;

FIG. 9C shows an example of the augmented reality content of FIG. 9B overlayed on the desktop region of FIG. 9A;

FIG. 9D shows another example of the augmented reality content of FIG. 9B overlayed on the desktop region of FIG. 9A;

FIG. 10A shows an example of a desktop divided into tiles;

FIG. 10B shows example augmented reality content divided into tiles; and

FIG. 10C shows scaled augmented reality content.

DETAILED DESCRIPTION INCLUDING BEST MODE

Figure 1:
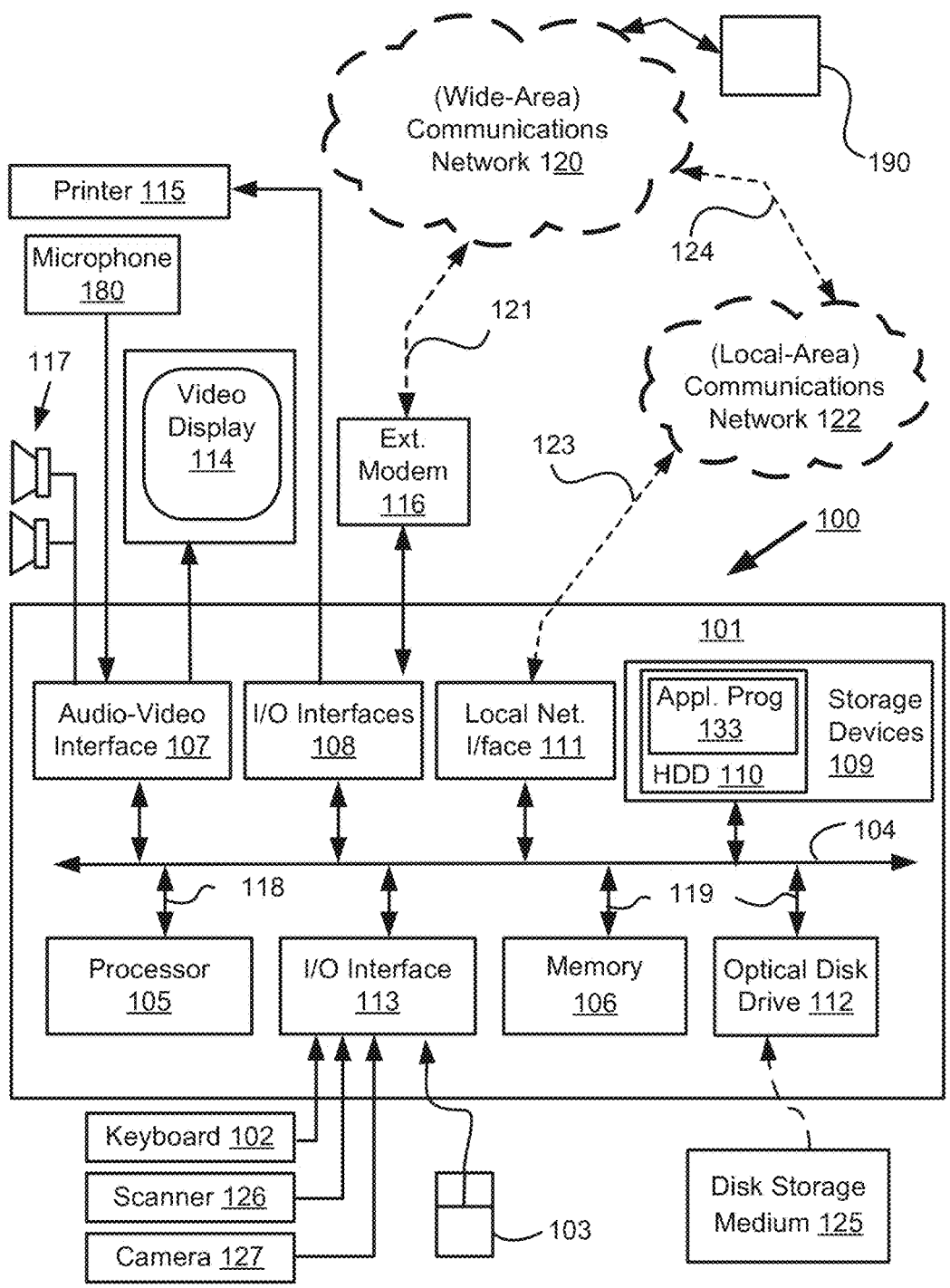
FIGS. 1 and 2 form a schematic block diagram of an augmented reality projection system upon which arrangements described can be practiced.

Where reference is made in any one or more of the accompanying drawings to steps and/or features, which have the same reference numerals, those steps and/or features have for the purposes of this description the same function(s) or operation(s), unless the contrary intention appears.

Projection based augmented reality systems may be used in office environments. In such an environment, a camera of a projection based augmented reality system is typically used to detects objects, documents etc., in a scene and a projector is used to project augmented information at an appropriate location in relation to a detected object or document in the scene. For example, a camera and a projector may be fixed in relation to an employee's desk such that the camera can capture images of the desk in real-time and the projector can project augmented information according to the captured images.

Traditionally, a desk environment in an office contains a variety of objects on the desk, in addition to documents, including pens, a keyboard, a mouse, a telephone, cups, etc. As the uptake of augmented reality in the office environment increases, problems may arise when augmented content associated with a document is displayed on a desk in an office, alongside other augmented content or real-world objects. For example, augmentation may collide with real-world content, which affects legibility or readability of augmented content.

To address the problem of collision between augmented content and real-world content, an empty rectangular region of a scene may be determined and used for augmentation. However, such a method does not work in cases where the empty rectangular region is not available or is not suitably located in relation to a physical object being augmented.

Another method of addressing the problem of collision between augmented content and real-world content is to use a larger region of a scene in and around a physical object being augmented. The augmentation may then be moved to a suitable sub-region within the larger region. While using a larger region in such a method allows some flexibility, the method typically requires manual intervention from the user which will diminish the overall user experience.

Legibility of textual information viewed on user interfaces can vary depending on the backdrop against which the textual information is viewed. When a backdrop is known a priori, textual style and colour can be varied accordingly to enhance legibility. However, when the background is either unknown or too complex, trial and error is often used to determine a suitable style and/or colour for the backdrop. However, trial and error cannot be used in a projection based augmented reality system which is used for projecting augmented reality content, since the background is typically both complex as well as varying with time. Further, a trial and error method may ruin the experience for a user. Legibility of projected augmented reality (AR) content can vary, particularly where the augmented reality content is being projected onto a surface of an office work desktop that might have a number of items on the desk such as printouts, computer keyboards, phones and other environmental conditions that are difficult to control. In many cases, carefully designed augmented reality content may be easily legible under some conditions and illegible under others, depending on the background detail of the surface onto which the augmented reality content is being projected. Since background conditions may vary from moment to moment in dynamic augmented reality usage contexts, the interaction of background textures, real world objects, and associated projected augmented reality graphics needs to be considered in projecting augmented reality content.

Methods described below improve legibility of augmented reality content when the augmented reality content is projected against a complex background.

Figure 3:
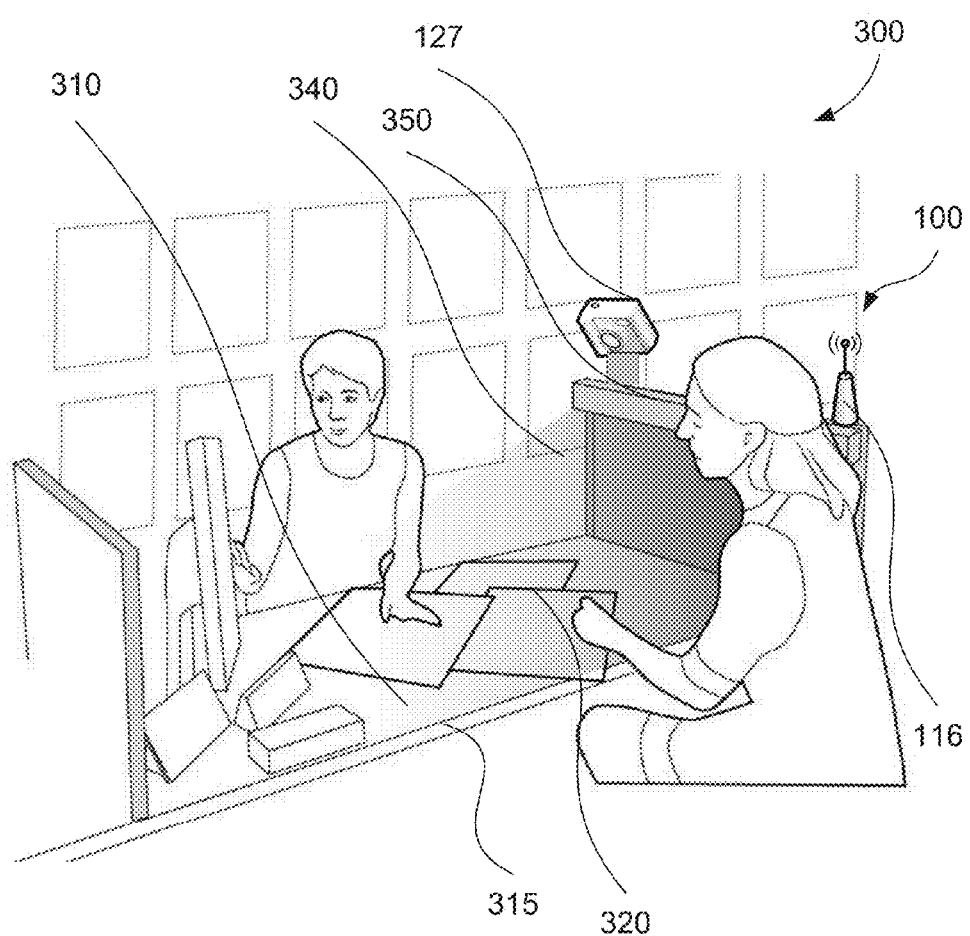
FIG. 3 shows an example of an office environment comprising the system of FIGS. 1 and 2.

FIG. 3 shows an example of an office environment 300 that has an augmented reality projection system 100 configured to project augmented reality content onto a surface 310 of a desktop 315. The augmented reality projection system 100 comprises a camera 127, an augmented reality projector 350 and a wireless access point (WAP) 116. The camera 127 is used to capture images of the surface 310 of the desktop 315. The projector 350 is used to project augmented reality content (e.g., content associated with a printed document 320).

Figure 2:
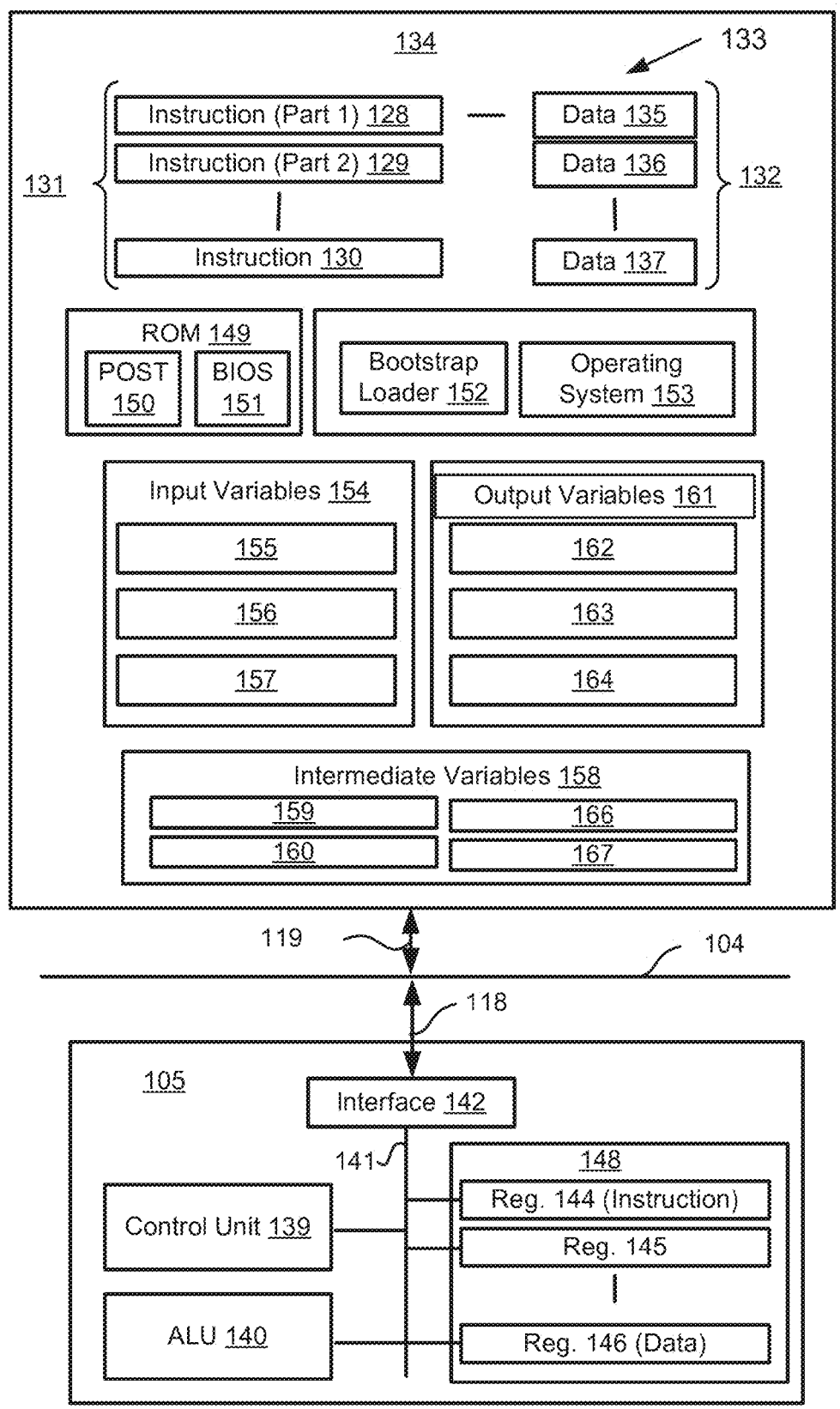

The wireless access point 116 is connected to a processor 105, via an interface 108 (see FIGS. 1 and 2). The processor 105 is configured for executing processes necessary for displaying projected augmented reality content. In one arrangement, the processes for displaying projected augmented reality content may be executed by a server 190 as shown in FIG. 1.

FIGS. 1 and 2 show the augmented reality projection system 100, upon which the various arrangements described can be practiced.

As seen in FIG. 1, the augmented reality projection system 100 comprises: a computer module 101; input devices such as a keyboard 102, a mouse pointer device 103, a scanner 126, the camera 127, loudspeakers 117 and a microphone 180; and output devices including a printer 115, a display device 114 and the projector 350. The wireless access point 116 may be in the form of an external wireless modulator-demodulator ("modem") transceiver device. The wireless access point 116 may be used by the computer module 101 for wirelessly communicating to and from a communications network 120 via a connection 121. The communications network 120 may be a wide-area network (WAN), such as the Internet, a cellular telecommunications network, or a private WAN. The connection 121 may a high capacity connection and the modem 116 may be a broadband modem.

In another arrangement, the connection 121 may be a telephone line, and the modem may be a traditional "dial-up" modem. In still another arrangement, the connection 121 may be a high capacity (e.g., cable) connection and the modem may be a broadband modem.

The computer module 101 typically includes at least one processor unit 105, and a memory unit 106. For example, the memory unit 106 may have semiconductor random access memory (RAM) and semiconductor read only memory (ROM). The computer module 101 also includes an number of input/output (I/O) interfaces including: an audio-video interface 107 that couples to the video display 114, the loudspeakers 117, the projector 350 and microphone 180; an I/O interface 113 that couples to the keyboard 102, mouse 103, scanner 126, camera 127 and optionally a joystick or other human interface device (not illustrated); and an interface 108 for the wireless access point 116 and printer 115. In some implementations, the wireless access point 116 may be incorporated within the computer module 101, for example within the interface 108. The computer module 101 also has a local network interface 111, which permits coupling of the system 100 via a connection 123 to a local-area communications network 122, known as a Local Area Network (LAN). As illustrated in FIG. 1, the local communications network 122 may also couple to the wide network 120 via a connection 124, which would typically include a so-called "firewall" device or device of similar functionality. The local network interface 111 may comprise an Ethernet circuit card, a Bluetooth® wireless arrangement or an IEEE 802.11 wireless arrangement; however, numerous other types of interfaces may be practiced for the interface 111.

The I/O interfaces 108 and 113 may afford either or both of serial and parallel connectivity, the former typically being implemented according to the Universal Serial Bus (USB) standards and having corresponding USB connectors (not illustrated). Storage devices 109 are provided and typically include a hard disk drive (HDD) 110. Other storage devices such as a floppy disk drive and a magnetic tape drive (not illustrated) may also be used. An optical disk drive 112 is typically provided to act as a non-volatile source of data. Portable memory devices, such optical disks (e.g., CD-ROM, DVD, Blu Ray Disc™), USB-RAM, portable, external hard drives, and floppy disks, for example, may be used as appropriate sources of data to the system 100.

The components 105 to 113 of the computer module 101 typically communicate via an interconnected bus 104. For example, the processor 105 is coupled to the system bus 104 using a connection 118. Likewise, the memory 106 and optical disk drive 112 are coupled to the system bus 104 by connections 119. Examples of computers on which the described arrangements can be practised include IBM-PC's and compatibles, Sun Sparcstations, Apple Mac™ or a like computer systems.

Figure 5:
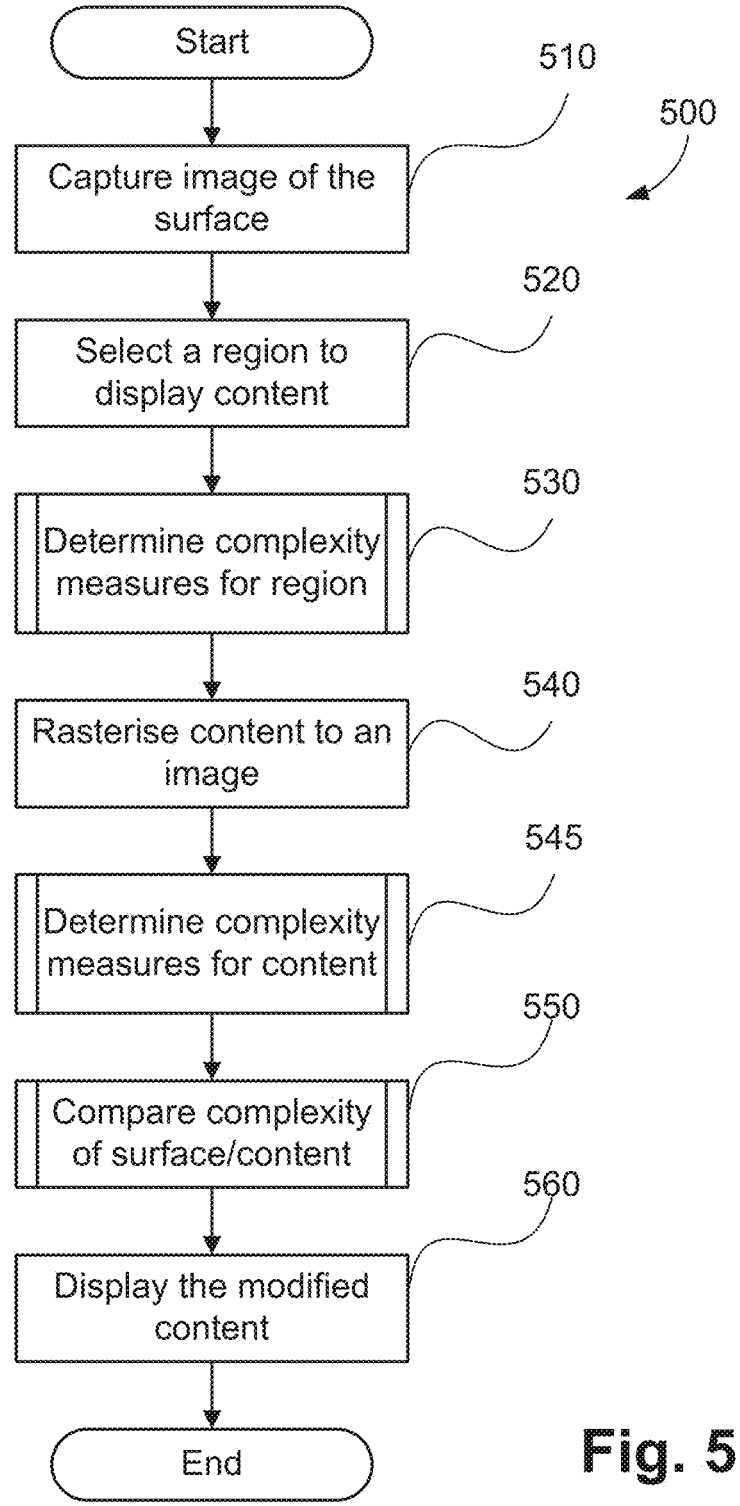
FIG. 5 is a schematic flow diagram showing a method of displaying modified augmented reality content.
Figure 6:
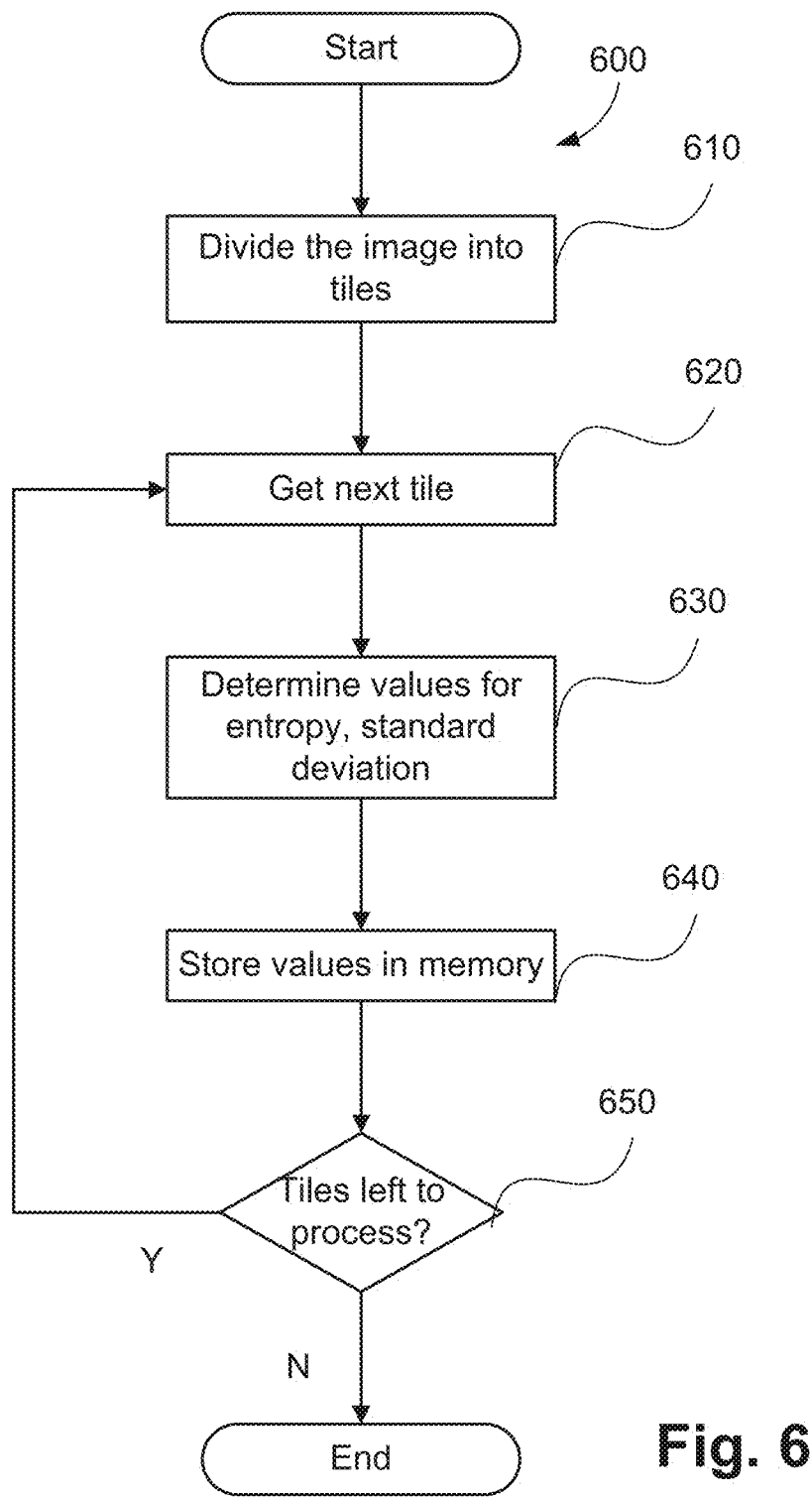
FIG. 6 is a schematic flow diagram showing a method of determining complexity measures associated with an image.
Figure 7:
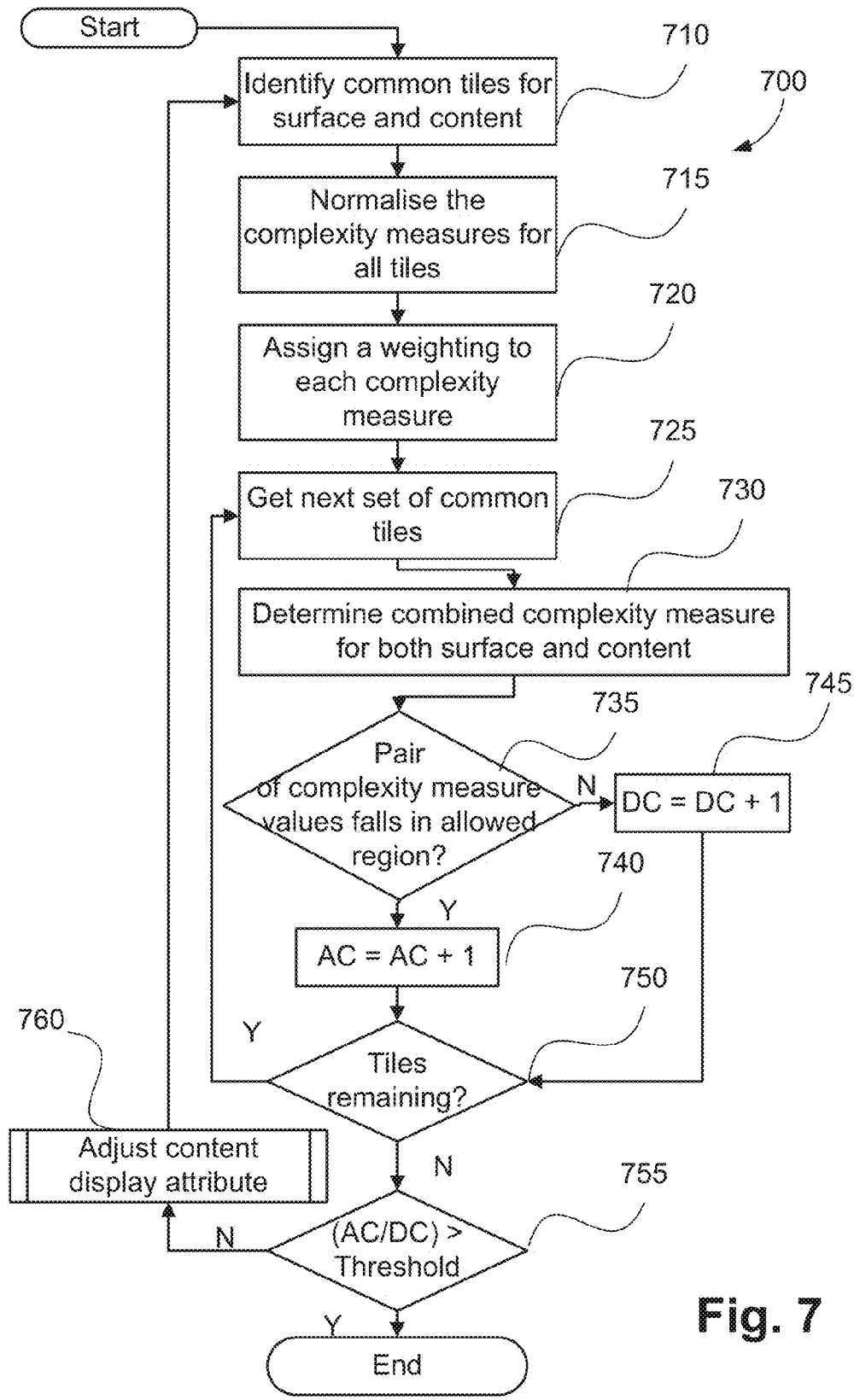
FIG. 7 is a schematic flow diagram showing a method of comparing complexity measures associated with a surface and augmented reality content.

Methods described here may be implemented using the augmented reality projection system 100 wherein the processes of FIGS. 5, 6 and 7, to be described, may be implemented as one or more software application programs 133 executable within the augmented reality projection system 100. In particular, the steps of the described methods are effected by instructions 131 (see FIG. 2) in the software 133 that are carried out within the system 100. The software instructions 131 may be formed as one or more code modules, each for performing one or more particular tasks. The software may also be divided into two separate parts, in which a first part and the corresponding code modules performs the described methods and a second part and the corresponding code modules manage a user interface between the first part and the user.

The software may be stored in a computer readable medium, including the storage devices described below, for example. The software 133 is typically stored in the HDD 110 or the memory 106. The software is loaded into the augmented reality projection system 100 from the computer readable medium, and then executed by the system 100. Thus, for example, the software 133 may be stored on an optically readable disk storage medium (e.g., CD-ROM) 125 that is read by the optical disk drive 112. A computer readable medium having such software or computer program recorded on the computer readable medium is a computer program product. The use of the computer program product in the system 100 preferably effects an advantageous apparatus for implementing the described methods.

In some instances, the application programs 133 may be supplied to the user encoded on one or more CD-ROMs 125 and read via the corresponding drive 112, or alternatively may be read by the user from the networks 120 or 122. Still further, the software can also be loaded into the augmented realty projection system 100 from other computer readable media. Computer readable storage media refers to any non-transitory tangible storage medium that provides recorded instructions and/or data to the system 100 for execution and/or processing. Examples of such storage media include floppy disks, magnetic tape, CD-ROM, DVD, Blu-Ray™ Disc, a hard disk drive, a ROM or integrated circuit, USB memory, a magneto-optical disk, or a computer readable card such as a PCMCIA card and the like, whether or not such devices are internal or external of the computer module 101. Examples of transitory or non-tangible computer readable transmission media that may also participate in the provision of software, application programs, instructions and/or data to the computer module 101 include radio or infra-red transmission channels as well as a network connection to another computer or networked device, and the Internet or Intranets including e-mail transmissions and information recorded on Websites and the like.

The second part of the application programs 133 and the corresponding code modules mentioned above may be executed to implement one or more graphical user interfaces (GUIs) to be rendered or otherwise represented upon the display 114. Through manipulation of typically the keyboard 102 and the mouse 103, a user of the system 100 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 117 and user voice commands input via the microphone 180.

FIG. 2 is a detailed schematic block diagram of the processor 105 and a "memory" 134. The memory 134 represents a logical aggregation of all the memory modules (including the HDD 109 and semiconductor memory 106) that can be accessed by the computer module 101 in FIG. 1.

When the computer module 101 is initially powered up, a power-on self-test (POST) program 150 executes. The POST program 150 is typically stored in a ROM 149 of the semiconductor memory 106 of FIG. 1. A hardware device such as the ROM 149 storing software is sometimes referred to as firmware. The POST program 150 examines hardware within the computer module 101 to ensure proper functioning and typically checks the processor 105, the memory 134 (109, 106), and a basic input-output systems software (BIOS) module 151, also typically stored in the ROM 149, for correct operation. Once the POST program 150 has run successfully, the BIOS 151 activates the hard disk drive 110 of FIG. 1. Activation of the hard disk drive 110 causes a bootstrap loader program 152 that is resident on the hard disk drive 110 to execute via the processor 105. This loads an operating system 153 into the RAM memory 106, upon which the operating system 153 commences operation. The operating system 153 is a system level application, executable by the processor 105, to fulfil various high level functions, including processor management, memory management, device management, storage management, software application interface, and generic user interface.

The operating system 153 manages the memory 134 (109, 106) to ensure that each process or application running on the computer module 101 has sufficient memory in which to execute without colliding with memory allocated to another process. Furthermore, the different types of memory available in the system 100 of FIG. 1 must be used properly so that each process can run effectively. Accordingly, the aggregated memory 134 is not intended to illustrate how particular segments of memory are allocated (unless otherwise stated), but rather to provide a general view of the memory accessible by the computer system 100 and how such is used.

As shown in FIG. 2, the processor 105 includes a number of functional modules including a control unit 139, an arithmetic logic unit (ALU) 140, and a local or internal memory 148, sometimes called a cache memory. The cache memory 148 typically includes a number of storage registers 144-146 in a register section. One or more internal busses 141 functionally interconnect these functional modules. The processor 105 typically also has one or more interfaces 142 for communicating with external devices via the system bus 104, using a connection 118. The memory 134 is coupled to the bus 104 using a connection 119.

The application program 133 includes a sequence of instructions 131 that may include conditional branch and loop instructions. The program 133 may also include data 132 which is used in execution of the program 133. The instructions 131 and the data 132 are stored in memory locations 128, 129, 130 and 135, 136, 137, respectively. Depending upon the relative size of the instructions 131 and the memory locations 128-130, a particular instruction may be stored in a single memory location as depicted by the instruction shown in the memory location 130. Alternately, an instruction may be segmented into a number of parts each of which is stored in a separate memory location, as depicted by the instruction segments shown in the memory locations 128 and 129.

In general, the processor 105 is given a set of instructions which are executed therein. The processor 1105 waits for a subsequent input, to which the processor 105 reacts to by executing another set of instructions. Each input may be provided from one or more of a number of sources, including data generated by one or more of the input devices 102, 103, data received from an external source across one of the networks 120, 102, data retrieved from one of the storage devices 106, 109 or data retrieved from a storage medium 125 inserted into the corresponding reader 112, all depicted in FIG. 1. The execution of a set of the instructions may in some cases result in output of data. Execution may also involve storing data or variables to the memory 134.

The disclosed arrangements use input variables 154, which are stored in the memory 134 in corresponding memory locations 155, 156, 157. The disclosed arrangements also produce output variables 161, which are stored in the memory 134 in corresponding memory locations 162, 163, 164. Intermediate variables 158 may be stored in memory locations 159, 160, 166 and 167.

Referring to the processor 105 of FIG. 2, the registers 144, 145, 146, the arithmetic logic unit (ALU) 140, and the control unit 139 work together to perform sequences of micro-operations needed to perform "fetch, decode, and execute" cycles for every instruction in the instruction set making up the program 133. Each fetch, decode, and execute cycle comprises:

a fetch operation, which fetches or reads an instruction 131 from a memory location 128, 129, 130;

a decode operation in which the control unit 139 determines which instruction has been fetched; and an execute operation in which the control unit 139 and/or the ALU 140 execute the instruction.

Thereafter, a further fetch, decode, and execute cycle for the next instruction may be executed. Similarly, a store cycle may be performed by which the control unit 139 stores or writes a value to a memory location 132.

Each step or sub-process in the processes of FIGS. 5, 6 and 7 is associated with one or more segments of the program 133 and is performed by the register section 144, 145, 147, the ALU 140, and the control unit 139 in the processor 105 working together to perform the fetch, decode, and execute cycles for every instruction in the instruction set for the noted segments of the program 133.

The described methods may alternatively be implemented in dedicated hardware such as one or more integrated circuits performing the functions or sub functions of the described methods. Such dedicated hardware may include graphic processors, digital signal processors, or one or more microprocessors and associated memories.

Figure 4A:
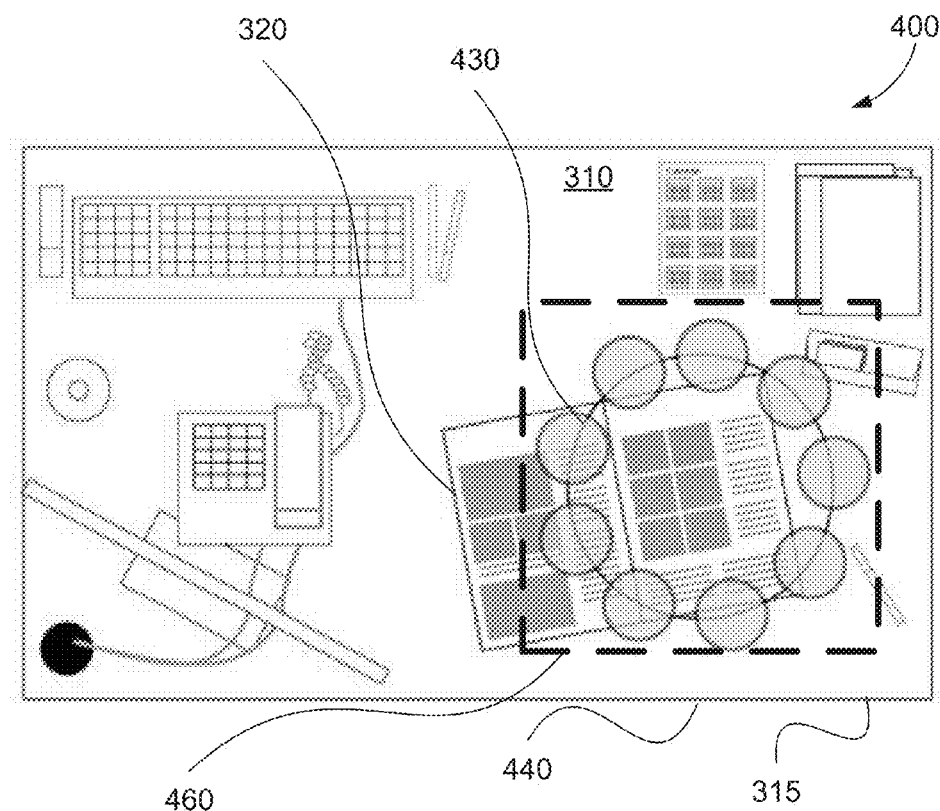
FIG. 4A shows a surface of an example desktop onto which augmented reality content is be projected.

FIG. 4A shows a portion of the surface 310 of the desktop 315 in more detail. FIG. 4A will be described in more detail below with reference to FIG. 5

FIG. 5 is a schematic flow diagram showing a method of displaying modified augmented reality content. The method 500 may be implemented as one or more software code modules of the software application program 133 resident on the hard disk drive 110 and being controlled in its execution by the processor 105. The method 500 will be described by way of example with reference to a physical surface such as the surface 310 of the desktop 315 as shown in FIGS. 3 and 4A. In the example, augmented reality content to be projected onto the physical surface 310 may be stored in the memory 106.

The method 500 begins at capturing step 510, where the camera 127 is used to capture an image of a portion of the surface 310 of the desktop 315, known as desktop region 440, that augmented reality content 430 is to be projected onto. The processor 105 may send a signal to the camera 127 in order to initiate step 510 and capture the image. The captured image may be stored by the processor 105 in the memory 106. Alternatively, the captured image may be transmitted to the server 190, via the wireless access point (WAP) 116 and the network 120, and be stored in a memory of the server 190.

Then at selecting step 520, an augmented reality (AR) content projection region 460 of the desktop region 440 is selected, under execution of the processor 105, for projecting the augmented reality content 430. The desktop region 440 can be selected using any suitable method. For example, the geometric centre of the desktop region 440 may be determined under execution of the processor 105, and the augmented reality content 430 may be symmetrically projected onto the surface 310 of the desktop 315 around the determined geometric centre. In this instance, the symmetrical region around the geometric centre forms the selected augmented reality content projection region 460.

Alternatively, the augmented reality projection system 100 may be used for identifying an image or graphic on a printed document 320 that is closely related to the augmented reality content 430. Selecting an image or graphic on the printed document 320 that is closely related to the augmented reality content 430 ensures close proximity. The augmented reality content 430 may be symmetrically projected onto the surface 310 of the desktop 315 around the identified image or graphic, so that the symmetrical region around the image or graphic forms the selected augmented reality content projection region 460.

In another alternative, the augmented reality content projection region 460 may be based on a user gesture. For example, the user may trace out a region within the desktop region 440 using their finger or another pointing device. Such a gesture may be detected by the camera 127 and interpreted by the processor 105 to determine the selected augmented reality content projection region 460. Alternatively, the gesture may be interpreted by the server 190 to determine the selected augmented reality content projection region 460.

The method 500 then proceeds to determining step 530, where complexity measures are determined, under execution of the processor 105, for physical surface 310 from the captured image of the desktop region 440 selected in step 510. The complexity measures determined step 530 may be referred to as surface complexity measures. A method 600 of determining complexity measures, as executed at step 530, will be described in detail below with reference to FIG. 6.

In rasterising step 540, the augmented reality content 430, stored in memory 106 is rasterised to image pixels, under execution of the processor 105, and stored in memory 106. Alternatively, if the augmented reality content 430 is already stored in the memory 106 as image pixels, then step 540 can be omitted.

The method 500 then proceeds to determining step 545. At step 545, complexity measures are determined for the image pixels representing the augmented reality content 430, in accordance with the method 600, under execution of the processor 105. A complexity measure determined for the augmented reality content 430 to be applied to the physical surface 310 may be referred to a "content complexity measure". The content complexity measure is used for representing an amount of fine detail in augmented reality content, such as the augmented reality content 430.

Then at comparing step 550, the complexity measures determined at step 530 are compared to the complexity measures determined at step 545 to determine whether or not the augmented reality content 430 needs to be modified for display. The complexity measures are compared at step 550 to determine if the amount of fine detail in the augmented reality content 430 is to be modified. As described in detail below, the determination of whether or not the augmented reality content 430 needs to be modified for display is based on a function of the surface complexity measure determined at step 530 and the content complexity measure determined at step 545. A method 700 of comparing complexity measures, as executed at step 550, will be described in detail below with reference to FIG. 7.

The method 500 then concludes in displaying step 560, where the augmented reality content 430 is displayed on the surface 310 of the desktop 315 within the boundaries of the augmented reality content projection region 460 selected at step 520. The displayed augmented reality content may have been modified at step 550 so that the modified augmented reality content is displayed on the physical surface 310 at step 560.

The method 600 of determining complexity measures, as executed at step 530, will be described in detail below with reference to FIG. 6. The method 600 may be implemented as one or more software code modules of the software application program 133 resident on the hard disk drive 110 and being controlled in its execution by the processor 105. Again, the method 600 will be described by way of example with reference to the surface 310 of the desktop 315 as shown in FIGS. 3 and 4A, where the augmented reality content 430 is to be projected onto the surface 310 of the desktop 315.

The input to the method 600 executed at step 530 is the image of the desktop region 440 selected in step 510. The method 600 is also executed at step 545. However, at step 545 the input to the method 600 is the image pixels representing the augmented reality content 430.

The method 600 determines a set of complexity measures associated with a raster image representing the desktop region 440. An example of complexity measures associated with a raster image is standard deviation of pixel values. Another example of complexity measures associated with a raster image is entropy of the pixel values. The standard deviation is defined as the square root of an unbiased estimator of variance of the pixel values of the raster image. The entropy is defined as a statistical measure of randomness that can be used to characterize texture of the raster image. Entropy, J, may be defined in accordance with Equation (1), as follows:

$$J=-\text{sum}(p.*\log 2(p)) \quad (1)$$

where p represents histogram counts of binned pixel values.

The method 600 begins at dividing step 610, where the image of the desktop region 440 stored in memory 106 is divided into tiles. A tile is a block of pixels where there are multiple blocks per band across the width of the image and multiple bands of blocks down the length of the image. Tiles are disjoint and cover the entire image. There are a number of methods that can be used to determine size of a tile size for a raster image. For example, the tile size can be selected based on entropy measure of the image. Table 1 below shows a set of typical values of tile size for an eight (8) bit greyscale image.

TABLE 1

| Entropy value (J) | Tile size coverage |
|---|---|
| J > 5 | <0.5% |
| 4 > J > 5 | 1% |
| 3 > J > 4 | 5% |
| 2 > J > 3 | 10% |
| 1 > J > 2 | 25% |
| J < 1 | 100% |

A high entropy value (i.e. J>5.0) for an eight (8) bit greyscale image, indicates that each tile for the image should have a coverage of <0.5% of the image. Alternatively the resolution of the image can be used to determine a tile size for the image at step 530.

The tile size is determined at step 610 based on the raster image associated with the image of the desktop region 440 captured at step 510. The same tile size determined at step 530 in accordance with the method 600 is then applied to the raster image associated with the augmented reality (AR) content in step 540.

The tiled raster image data representing the desktop region 440 is then stored in memory 106, each tile being given an individual tile number based on the block of pixels the tile represents.

The method then proceeds to selecting step 620, where the processor 105 selects a next (or first as the case may be) image tile to be processed from the memory 106 and proceeds to determining step 630.

At step 630, the processor 105 is used to determine the standard deviation and entropy for the pixel values of the image tile selected at step 620. Then at step 640, values representing the determined standard deviation and entropy are store in memory 106 and associated with a tile number for the selected tile which standard deviation and entropy values represent.

At decision step 650, the processor 105 is used to determine if there are any more tiles within the raster image associated with the image of the desktop region 440 captured at step 510 to be processed. If there are any more tiles remaining to be processed, then the method 600 returns to step 620 where a next tile to be processed is selected. Otherwise, where all tiles have been determined to be processed at step 650, the method 600 concludes.

The method 700 of comparing complexity measures, as executed at step 550, will now be described in detail with reference to FIG. 7. The method 700 may be implemented as one or more software code modules of the software application program 133 resident on the hard disk drive 110 and being controlled in its execution by the processor 105.

The method 700 determines if the attributes of the augmented reality content 430 needs to be adjusted for display in order to increase legibility of the augmented reality content with respect to background complexity. Display attributes and examples of how the display attributes can be adjusted will be described below with reference to FIG. 8. As described in detail below, a display attribute of the augmented reality content 430 may be adjusted to modify fine detail in the augmented reality content. The modified display attribute may be size of the augmented reality content 430.

The method 700 begins at identifying step 710, where common tiles for the desktop region 440 and augmented reality content 430 are identified under execution of the processor 105. Common tiles will now be described by way of example with reference to FIG. 4B.

Figure 4B:
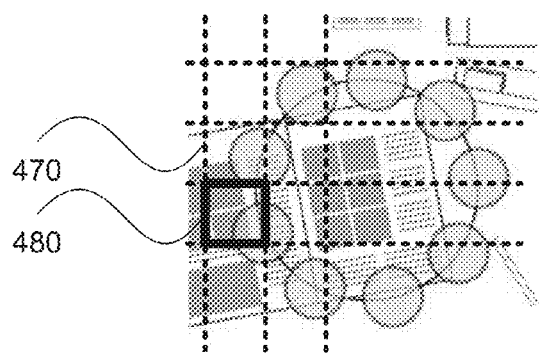
FIG. 4B shows an expanded view of a portion of the surface of FIG. 4A.

FIG. 4B shows an expanded view of a portion of the surface 310 of the desktop 315 of FIG. 4A. The portion of the surface 310 as shown in FIG. 4B is divided into a plurality of square tiles represented as dashed or solid lines. In particular, FIG. 4B shows a desktop region tile 470 as dashed lines. Other desktop region tiles, also represented in dashed lines, are also shown in FIG. 4B.

FIG. 4B also shows an augmented reality content tile 480 in a solid line. In the example of FIG. 4B, the desktop region tile 470 and augmented reality content tile 480 both overlap and snap-to and are referred to as common tiles. For any desktop region 440 and augmented reality content 430 there will be a set of common tiles.

The common tiles identified at step 710 are stored in the memory 106, where the stored common tiles are referenced by respective tile numbers in the memory 106. In another arrangement, the identified common tiles may be stored on the server 190.

The method 700 then proceeds to normalising step 715, where the tile numbers of both the desktop region 440 and the augmented reality content 430 identified at step 710 are retrieved from the memory 106 under execution of the processor 105. The tile numbers of both the desktop region 440 and the augmented reality content 430 are used to reference the respective complexity measures determined at step 530 and 545.

At step 715, an array is created in the memory 106 for each of the complexity measures (i.e. the entropy and standard deviation complexity measures). The values of the complexity measures are then normalised. The normalisation may, for example, be carried out by determining the maximum value of each complexity measure and dividing each of the values of the complexity by the maximum value. The normalisation of the complexity measures ensures that complexity measures for all tiles of the desktop region 440 and the tiles of the augmented reality content 430 fall between zero and one. Step 715 ensures that a relative comparison of complexity can be carried out between desktop region tiles and augmented reality content tiles.

The method 700 continues at a next determining step 720, where a relative weighting is determined, under execution of the processor 105, for each of the complexity measures. Each determined weighting is assigned to a corresponding complexity measure.

The relative weightings are determined at step 720 for use in combining the complexity measures into a combined complexity measure. For example, a combined complexity measure may be achieved through a linear combination of individual complexity measures. Different weightings may be used for each complexity measure depending on the augmented reality content to be displayed. For example, if the augmented reality content 430 consists of an image, then more weighting is given to the entropy complexity measure. In contrast, if the augmented reality content 430 consists of text, more weighting is given to the standard deviation complexity measure.

The method 700 continues at the next step 725, where a first set of common tiles and their respective complexity measures are retrieved from the memory 106. Then at determining step 730, a combined complexity measure is determined for the tile of desktop region 440 under execution of the processor 105. Also at step 730, a combined complexity measure is determined for the tile of augmented reality content 430.

Figure 8:
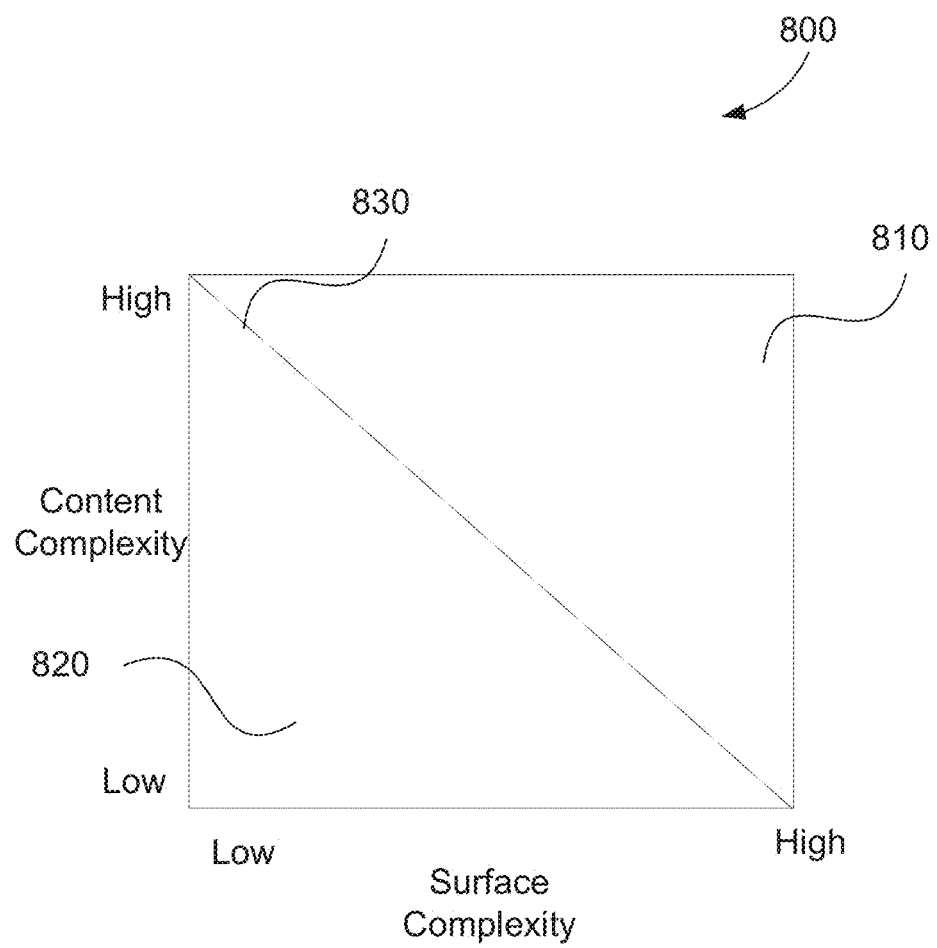
FIG. 8 is a complexity graph showing the relationship between projection surface complexity and augmented reality content complexity, using a complexity discrimination function.

Then at decision step 735, an ordered pair of the two complexity measure values output from step 730 is placed on a complexity graph. For example, FIG. 8 shows a complexity graph 800. The complexity graph 800 allows complexity of augmented reality content 430 to be compared to complexity of a desktop region 440 that the augmented reality content 430 is to be projected on. The complexity graph 800 may be used to determine if the augmented reality content 430 will be legible based on the level of detail. For example, if the complexity of the desktop region 440 is low then the complexity of the augmented reality content 430 can range between both low and high. Alternatively, if the complexity of the desktop region 440 is high then the augmented reality content 430 must be low in order for the augmented reality content 430 to be legible. The graph 800 therefore consists of two regions; the allowed region 820 and the disallowed region 810, separated by a complexity discrimination function 830. In the example shown in FIG. 8, the complexity discrimination function 830 is a linear function. Other functions may also be used.

Depending on which region the ordered pair of complexity measures output from step 730 falls into, the method 500 either proceeds to step 740 or step 745. In the case the ordered pair of complexity measures falls into the allowed region 820 the method 700 proceeds to incrementing step 740. At incrementing step 740, an allowed complexity counter, AC, configured within memory 106 is incremented. In the case that the ordered pair of complexity measures fall into disallowed region 810, then the method 700 proceeds to incrementing step 745. At step 745, a disallowed complexity counter, DC, configured within memory 106 is incremented by one.

At decision step 750, if there are any common sets of tiles remaining then the method 700 returns to step 725. Otherwise, if there are no common sets of tiles remaining, then the method 700 proceeds to decision step 755.

At decision step 755, the ratio of DC with respect to AC is determined and compared to a pre-determined threshold. If the ratio is greater than the pre-determined threshold, then the method 700 concludes. If the ratio is less than the threshold, then the method 700 proceeds to adjusting step 760. At step 760, display attributes of the augmented reality content 430 are adjusted such that the level of complexity is decreased on a tile by tile basis. One or more of the display attributes of the augmented reality content 430 may be adjusted to modify the fine detail in the augmented reality content 430. Following step 760, the method 700 then proceeds to step 710, where the augmented reality content 430 is re-assessed to ensure that the adjustment of display attributes has resulted in increased legibility.

Table 2, below, shows how, based on the type of augmented reality content 430, the AC/DC ratio determined in step 755 can be used to determine how to adjust the augmented reality content display attributes. For example, in the event that the type of augmented reality content 430 is an image, then the scaling matrix depicted in the first row of Table 2 may be applied.

TABLE 2

| AR content type | Display attribute | Adjustment |
|---|---|---|
| Image | Scale | $\begin{bmatrix} (1 + 5(Th - \frac{AC}{DC})) & 0 \\ 0 & (1 + 5(Th - \frac{AC}{DC})) \end{bmatrix}$ |
| Text | Font size | $F_f = F_i + 2(Th - \frac{AC}{DC})$ |
| Graphic | Scale | $\begin{bmatrix} (1 + 5(Th - \frac{AC}{DC})) & 0 \\ 0 & (1 + 5(Th - \frac{AC}{DC})) \end{bmatrix}$ |

FIG. 9A shows an example of a desktop region 900 comprising some text. FIG. 9B shows an example of augmented reality content 901, in the form of an image, to be projected onto the desktop region 900 of FIG. 9A. FIG. 9C shows an example where the complexity of the augmented reality content 901 (i.e., the image) is of the same order as the complexity of the desktop region 900, therefore making it difficult to discern the augmented reality content 901. FIG. 9D shows an example where the complexity of the augmented reality content 901 (i.e., the image) is of the same order as the complexity of the desktop region 900, as in FIG. 9C. However in the example of FIG. 9D, the image 901 is scaled up to generate scaled image 910 so that the complexity of the image 910 is less than that of the desktop region 900 and therefore, the detail of the scaled image 910 is more discernible against the desktop region 900. The method 600 will now be further described by way of the example of FIGS. 9A to 9D.

FIG. 9A represents an example of a desktop region 900 as selected in step 520 of the method 500. The region 900 is divided into tiles, as at step 610, as shown in FIG. 10A. Also shown in FIG. 10A, tile 1010 is the 11$^{th}$ tile, in raster scan order, for the example desktop region 900 of FIG. 9A. In the example of FIGS. 9A to 9D, the entropy and standard deviation complexity measures are determined for the region 900, as at step 630. Table 3, below, shows a portion of the complexity measures determined for the example desktop region 900 of FIG. 9A, where "Tile #10" is the tile to the left of the tile 1010 (i.e., "Tile #10" in Table 3) and "Tile #12" in Table 3 is the tile to the right of tile 1010 in raster scan order.

TABLE 3

| Tile # | Entropy (J) | Standard deviation (SD) |
|---|---|---|
| . . . | . . . | . . . |
| 10 | 3.5 | 82.4 |
| 11 | 3.5 | 83.0 |
| 12 | 3.6 | 81.6 |
| . . . | . . . | . . . |

The method 600 continues until all tiles shown in FIG. 10A for the example desktop region 900 have been processed. The example augmented reality content 901 of FIG. 9B is rasterised to pixels as at step 540 of the method 500.

FIG. 10B shows the augmented reality content 901 divided into tiles. As seen in FIG. 10B, tile 1020 represents Tile #4 (see Table 4, below) for the example augmented reality content 901 of FIG. 9B. The method 600 is then applied to the example augmented reality content 901 of FIG. 9B. Table 4 shows a portion of the complexity measures determined for the example augmented reality content 901 of FIG. 9B.

TABLE 4

| Tile # | Entropy (J) | Standard deviation (SD) |
|---|---|---|
| . . . | . . . | . . . |
| 4 | 6.5 | 75.9 |
| . . . | . . . | . . . |

Continuing the example of FIGS. 9A to 9D, a comparison of the complexity measures determined for the example desktop region 900 of FIG. 9A and the complexity measures determined for the augmented reality content 901 is determined, as at step 550. Common tiles are identified as at step 710. In the present example, example desktop region tile 1010 (Tile #11) and example augmented content tile 1020 (Tile #4) are part of the common tiles, as the augmented reality content 901 is being projected onto the example desktop region 900 as shown in FIG. 9C.

Following comparison of the complexity measures, the values of the complexity measures are normalised as at step

715. As described above, the values of the complexity measures are normalised by determining the maximum values of the complexity measures from the complete set of common tiles. In accordance with the example of FIGS. 9A to 9D, normalised values determined (as at step 715) for some of the tiles shown in FIGS. 10A and 10B are shown in Tables 5 and 6.

TABLE 5

| Tile # | Normalised Entropy (JN) | Normalised Standard deviation (SDN) |
|---|---|---|
| ... | ... | ... |
| 10 | 0.5 | 0.96 |
| 11 | 0.5 | 0.98 |
| 12 | 0.5 | 0.95 |
| ... | ... | ... |

TABLE 6

| Tile # | Normalised Entropy (JN) | Normalised Standard deviation (SDN) |
|---|---|---|
| ... | ... | ... |
| 4 | 0.92 | 0.88 |
| ... | ... | ... |

Continuing the example of FIGS. 9A to 9D, a weighting is assigned to each of the determined complexity measures. Since the example augmented reality content 901 has been identified as an image, entropy is considered the more relevant complexity measure. Therefore, in accordance with the example of FIGS. 9A to 9D, a value of 0.75 is assigned to the entropy complexity measure and a value of 0.25 is assigned to the standard deviation complexity measure, as at step 720.

Continuing the example of FIGS. 9A to 9D, a combined complexity measure (CCV) is determined as at step 730. In the present example, the combined complexity measure (CCV) is determined for desktop region tile 1010 (Tile #11) and augmented reality content tile 1020 (Tile #4) according to Equation (3), as follows:

$$CCV=(0.75)JN+(0.25)SDN \quad (3)$$

where JN represents the normalised entropy and SDN represents the normalised standard deviation.

A resulting ordered pair of complexity measure values for the example desktop region 900 and the example augmented reality content 901 is (0.62, 0.91). As at decision step 735, the ordered pair of complexity measure values are compared to the discrimination function 830 on the complexity graph 800. The ordered pair of complexity measure values, (0.62, 0.91), falls into the disallowed region 810, indicating that level of detail in augmented reality content 901 of FIG. 9B is such that it would be difficult to discern against the example desktop region 900.

Continuing the example of FIGS. 9A to 9D, the method 700 proceeds to step 745 where the disallowed complexity counter (DC) configured within memory 106 is incremented by one (1) before the method 700 proceeds to decision step 750. The method then returns to step 725 to process any other common tiles.

When all common tiles for the example of FIGS. 9A to 9D have been processed, the ratio of the allowed complexity counter, AC, to the disallowed complexity counter, DC, is compared to a threshold, as at step 755. For example, the threshold may be set to 0.85, therefore requiring that at least 85% of common tiles are deemed legible. For the example of FIG. 9C, the AC/DC ratio is determined to be 0.67. The method 700 then proceeds to step 760 where an attribute of the example augmented reality content 901 of FIG. 9B is adjusted. Referring to Table 2, above, the augmented reality content 901 (i.e., the image of FIG. 9B) is scaled by a linear amount based on the shortfall of the determined AC/DC ratio value. The result of the scaling of the augmented reality content 901 is the image 910 as shown in FIG. 9D. FIG. 10C shows the tiling of the scaled augmented reality content 910 (i.e., the scaled image) as a result of the display attribute adjustment carried out in step 760.

Referring now to adjusted example augmented reality content tile 1030 (i.e., Tile #7) and adjusted example augmented reality content tile 1040 (i.e., Tile #11), as seen in FIG. 10C, there has been an overall decrease in the complexity of the augmented reality content 910 on a tile by tile basis compared to the augmented reality content 901 as shown in FIG. 10B. When step 550 is applied to example desktop region 900 of FIG. 9A and the newly scaled (or adjusted) example augmented reality content 910 as shown in FIG. 10C, the AC/DC ratio is determined to be 0.87. Accordingly, in accordance with the present example, the method 700 concludes and the method 500 proceeds to step 560 where the scaled (or adjusted) augmented reality content 910, as seen in FIG. 10C is displayed. The scaled (or adjusted) augmented reality content 910 may be displayed on a physical surface such as the surface 310 of the desktop 315.

The arrangements described are applicable to the computer and data processing industries and particularly for the image processing.

The foregoing describes only some embodiments of the present invention, and modifications and/or changes can be made thereto without departing from the scope and spirit of the invention, the embodiments being illustrative and not restrictive.

In the context of this specification, the word "comprising" means "including principally but not necessarily solely" or "having" or "including", and not "consisting only of". Variations of the word "comprising", such as "comprise" and "comprises" have correspondingly varied meanings.

The invention claimed is:

1. A method of displaying augmented reality content on a physical surface, the method comprising:
    determining a surface complexity measure for said physical surface from a captured image of said physical surface, said surface complexity measure representing an amount of fine detail in said captured image;
    determining a content complexity measure for the augmented reality content to be applied to said physical surface, said content complexity measure representing an amount of fine detail in said augmented reality content;
    adjusting a display attribute of said augmented reality content, based on a comparison of said surface complexity measure and said content complexity measure, to modify the fine detail in said augmented reality content thereby improving the legibility of the augmented reality content against said physical surface; and
    displaying the modified augmented reality content on said physical surface.

2. The method according to claim 1, wherein the display attribute is a size of the content.

3. The method according to claim 1, further comprising capturing an image of a portion of the physical surface.

4. The method according to claim 3, further comprising dividing the image into tiles.

5. The method according to claim 1, further comprising selecting a region of the physical surface for displaying the modified augmented reality content.

6. The method according to claim 5, further comprising determining a geometric centre of the region.

7. The method according to claim 5, further comprising identifying an image on a printed document.

8. The method according to claim 5, wherein the region is based on a user gesture.

9. The method according to claim 1, further comprising comparing the surface complexity measure to the content complexity measure to determine if the amount of fine detail in said augmented reality content is to be modified.

10. The method according to claim 1, further comprising projecting the modified augmented reality content.

11. The method according to claim 1, wherein the modified augmented reality content is displayed on the physical surface within a selected region of said physical surface.

12. The method according to claim 1, wherein the content complexity measure is standard deviation.

13. The method according to claim 1, wherein the content complexity measure is entropy.

14. A system for displaying augmented reality content on a physical surface, the system comprising:
- a memory for storing data and a computer program;
- a processor coupled to the memory for executing said computer program, said computer program comprising instructions for:
  - determining a surface complexity measure for said physical surface from a captured image of said physical surface, said surface complexity measure representing an amount of fine detail in said captured image;
  - determining a content complexity measure for the augmented reality content to be applied to said physical surface, said content complexity measure representing an amount of fine detail in said augmented reality content;
  - adjusting a display attribute of said augmented reality content, based on a comparison of said surface complexity measure and said content complexity measure, to modify the fine detail in said augmented reality content thereby improving the legibility of the augmented reality content against said physical surface; and
  - displaying the modified augmented reality content on said physical surface.

15. A non-transitory computer readable medium having a computer program stored thereon for displaying augmented reality content on a physical surface, the program comprising:
- code for determining a surface complexity measure for said physical surface from a captured image of said physical surface, said surface complexity measure representing an amount of fine detail in said captured image;
- code for determining a content complexity measure for the augmented reality content to be applied to said physical surface, said content complexity measure representing an amount of fine detail in said augmented reality content;
- code for adjusting a display attribute of said augmented reality content, based on a comparison of said surface complexity measure and said content complexity measure, to modify the fine detail in said augmented reality content thereby improving the legibility of the augmented reality content against said physical surface; and
- code for displaying the modified augmented reality content on said physical surface.

* * * * *